United States Patent
Fukamichi et al.

(10) Patent No.: US 12,002,954 B2
(45) Date of Patent: Jun. 4, 2024

(54) POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING POSITIVE ELECTRODE ACTIVE MATERIAL FOR NON-AQUEOUS ELECTROLYTE SECONDARY BATTERY

(71) Applicant: Panasonic Intellectual Property Management Co., Ltd., Osaka (JP)

(72) Inventors: Noriko Fukamichi, Osaka (JP); Toshinobu Kanai, Hyogo (JP); Takeshi Ogasawara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 541 days.

(21) Appl. No.: 17/275,355

(22) PCT Filed: Sep. 19, 2019

(86) PCT No.: PCT/JP2019/036812
§ 371 (c)(1),
(2) Date: Mar. 11, 2021

(87) PCT Pub. No.: WO2020/066848
PCT Pub. Date: Apr. 2, 2020

(65) Prior Publication Data
US 2022/0052334 A1    Feb. 17, 2022

(30) Foreign Application Priority Data
Sep. 28, 2018 (JP) .................................. 2018-185280

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/1391* (2013.01); *H01M 2004/028* (2013.01)

(58) Field of Classification Search
None
See application file for complete search history.

(56) References Cited

U.S. PATENT DOCUMENTS

| 2017/0352885 A1 | 12/2017 | Kondo et al. |
| 2018/0337403 A1 | 11/2018 | Komukai et al. |

FOREIGN PATENT DOCUMENTS

| CN | 108352524 A | 7/2018 |
| EP | 3370285 A1 | 9/2018 |

(Continued)

OTHER PUBLICATIONS

Machine Translation of JP2011124086 (Year: 2011).*

(Continued)

*Primary Examiner* — Wyatt P McConnell
(74) *Attorney, Agent, or Firm* — WHDA, LLP (57) ABSTRACT

According to one embodiment, a positive electrode active material for a non-aqueous electrolyte secondary battery contains a lithium/transition metal composite oxide that contains 80 mol % or more, relative to the total mol number of metal elements other than Li, of Ni and at least one kind of metal element selected from among Co, Mn, Al, W, Mg, Mo, Nb, Ti, Si and Zr. When a filtrate of a suspension, said suspension being prepared by adding 250 mg of the positive electrode active material to 10 mL of a 17.5 mass % aqueous solution of hydrochloric acid, dissolving by heating at 90° C. for 2 hours and then diluting to 50 mL, is analyzed by inductively coupled plasma mass spectrometry, the elution amount of S in the filtrate is 0.002 mmol or greater.

8 Claims, 1 Drawing Sheet

(51) Int. Cl.
*H01M 4/1391* (2010.01)
*H01M 4/02* (2006.01)

(56) References Cited

FOREIGN PATENT DOCUMENTS

| | | | |
|---|---|---|---|
| JP | 2005-216651 A | | 8/2005 |
| JP | 2010-040383 A | | 2/2010 |
| JP | 2011124086 | * | 6/2011 |
| JP | 2017-084513 A | | 5/2017 |
| WO | 2011/071068 A1 | | 6/2011 |
| WO | 2012/020768 A1 | | 2/2012 |

OTHER PUBLICATIONS

International Search Report dated Nov. 26, 2019, issued in counterpart application No. PCT/JP2019/036812 (1 page).
The Extended European Search Report dated Oct. 25, 2021, issued in counterpart EP Application No. 19865751.2. (31 pages).
English Translation of Chinese Search Report dated Jan. 22, 2024 issued in counterpart Chinese Patent Application No. 201980057640.7.

* cited by examiner

POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING POSITIVE ELECTRODE ACTIVE MATERIAL FOR NON-AQUEOUS ELECTROLYTE SECONDARY BATTERY

TECHNICAL FIELD

The present disclosure relates to a positive electrode active material for a non-aqueous electrolyte secondary battery, a non-aqueous electrolyte secondary battery using the positive electrode active material, and a method for producing the positive electrode active material.

BACKGROUND ART

Lithium transition metal composite oxides are generally used as positive electrode active materials for non-aqueous electrolyte secondary batteries such as lithium ion batteries. In recent years, a lithium transition metal composite oxide having a high content ratio of Ni has been widely used as a high-capacity positive electrode active material. For example, Patent Literature 1 has disclosed a method for producing a positive electrode active material, the method in which tungsten oxide and at least one selected from a sulfuric acid compound, a nitric acid compound, a boric acid compound, and a phosphoric acid compound are fixed to the surface of the particles of the lithium transition metal composite oxide containing Ni, and the composite particles are heat-treated in an oxygen atmosphere.

CITATION LIST

Patent Literature

PATENT LITERATURE 1: Japanese Unexamined Patent Application Publication No. 2010-040383

SUMMARY

It is an important subject to improve the charge-and-discharge cycle characteristics of the non-aqueous electrolyte secondary battery such as the lithium ion battery. In the conventional technology including the technology disclosed in Patent Literature 1, there is still room for improvement in the cycle characteristics of the battery. In the production method disclosed in Patent Literature 1, when the content ratio of Ni in the positive electrode active material is high, cation mixing occurs and then the initial capacity easily decreases.

An object of the present disclosure is to improve the charge-and-discharge cycle characteristics in a non-aqueous electrolyte secondary battery including a positive electrode active material containing 80 mol % or more of Ni with respect to the total number of moles of metal elements excluding Li.

The positive electrode active material for a non-aqueous electrolyte secondary battery according to one aspect of the present disclosure is a positive electrode active material including a lithium transition metal composite oxide, the lithium transition metal composite oxide containing 80 mol % or more of Ni with respect to the total number of moles of metal elements excluding Li and containing at least one metal element selected from Co, Mn, Al, W, Mg, Mo, Nb, Ti, Si, and Zr, wherein when 250 mg of the positive electrode active material is added to 10 mL of a 17.5% by mass hydrochloric acid aqueous solution, heated and dissolved at 90° C. for 2 hours and then filtered and diluted with distilled water to 50 mL, the amount of S dissolved in the diluted filtrate is 0.002 mmol or more as determined by inductively coupled plasma mass spectrometry.

The non-aqueous electrolyte secondary battery according to one aspect of the present disclosure comprises a positive electrode including the above positive electrode active material, a negative electrode, and a non-aqueous electrolyte.

A method for producing the positive electrode active material for a non-aqueous electrolyte secondary battery according to one aspect of the present disclosure includes: the step of oxidizing and roasting a hydroxide containing at least Ni obtained by a crystallization method to provide a composite oxide; the step of mixing the composite oxide with a lithium compound and firing the mixed particles to provide a lithium transition metal composite oxide; and the step of washing the lithium transition metal composite oxide with water, thereafter mixing the composite oxide with at least one selected from magnesium sulfate, zirconium sulfate, and cobalt sulfate, and heat-treating the mixture under a vacuum condition at a temperature of 150 to 280° C.

The positive electrode active material according to the present disclosure can provide a non-aqueous electrolyte secondary battery having excellent charge-and-discharge cycle characteristics. The charge-and-discharge cycle characteristics can be improved in a non-aqueous electrolyte secondary battery including a positive electrode active material containing 80 mol % or more of Ni with respect to the total number of moles of metal elements excluding Li.

DESCRIPTION OF EMBODIMENTS

As described above, it is an important subject to improve the charge-and-discharge cycle characteristics of the non-aqueous electrolyte secondary battery such as the lithium ion battery. As a result of intensive investigations to improve cycle characteristics by focusing on a positive electrode active material, the present inventors have found that the cycle characteristics of the battery are specifically improved when a predetermined amount of S is included in a filtrate of a suspension obtained by dispersing a positive electrode active material in a predetermined hydrochloric acid aqueous solution. The detailed mechanism of the improvement in the cycle characteristics is unclear; however, it is considered that S as a component dissolved is derived from $SO_4$, the compound containing $SO_4$ functions as a protective layer on the surfaces of the particles of the lithium transition metal composite oxide, and the decomposition reaction of the electrolytic solution on the surfaces of the particles is suppressed, thereby improving the cycle characteristics. When a predetermined amount of S is present in the filtrate, it is assumed that the function as the protective layer is sufficiently exhibited.

Hereinafter, an example of the embodiment of the positive electrode active material for a non-aqueous electrolyte secondary battery, the non-aqueous electrolyte secondary battery using the positive electrode active material, and a method for producing the positive electrode active material according to the present disclosure will be described in detail with reference to the drawing. Hereinafter, a cylindrical battery in which a wound electrode assembly 14 is housed in a cylindrical battery case is exemplified, and the electrode assembly is not limited to the wound type, and may be a laminate in which a plurality of positive electrodes and a plurality of negative electrodes are alternately laminated one by one via a separator. In addition, the non-aqueous electrolyte secondary battery according to the present disclosure may be a rectangular battery comprising a rectangular metal case, a coin battery comprising a coin-shaped metal case, or the like, and a laminated battery comprising an exterior body being composed of a laminate sheet including a metal layer and a resin layer.

Figure 1:
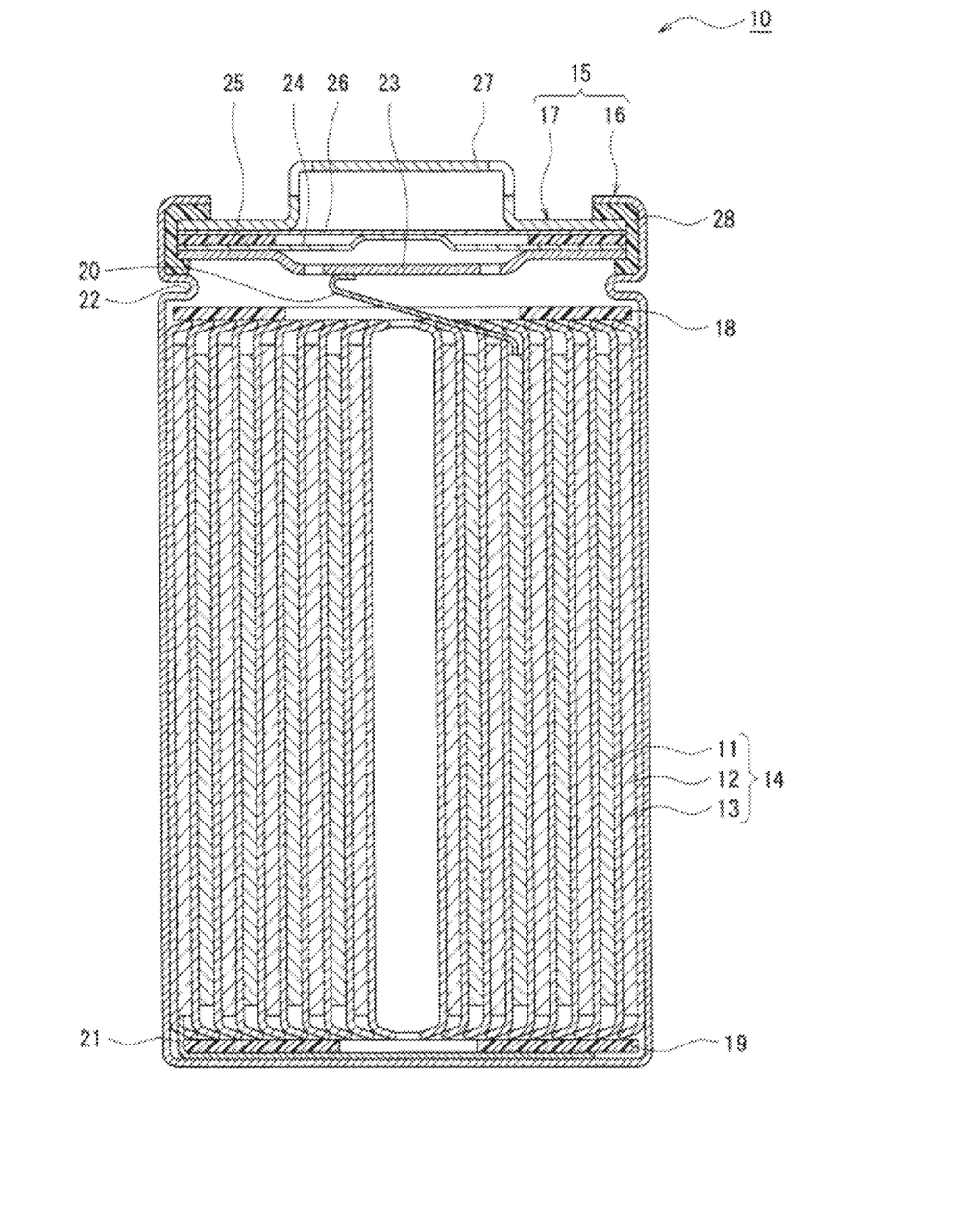
FIG. 1 is a sectional view of a non-aqueous electrolyte secondary battery that is an example of the embodiment.

FIG. 1 is a sectional view of a non-aqueous electrolyte secondary battery 10 according to an example of the embodiment. As illustrated in FIG. 1, the non-aqueous electrolyte secondary battery 10 comprises an electrode assembly 14, a electrolyte, and a battery case 15 that houses the electrode assembly 14 and the non-aqueous electrolyte. The electrode assembly 14 comprises a positive electrode 11, a negative electrode 12, and a separator 13, and has a wound structure in which the positive electrode 11 and the negative electrode 12 are wound via the separator 13. A battery case 15 is composed of a bottomed cylindrical exterior can 16 and a sealing assembly 17 that closes the opening of the exterior can 16.

A non-aqueous electrolyte includes a non-aqueous solvent and an electrolyte salt dissolved in the non-aqueous solvent. For example, esters, ethers, nitriles, amides, and a mixed solvent of two or more thereof may be used as the non-aqueous solvent. The non-aqueous solvent may contain a halogen substitute in which at least a part of hydrogen of these solvents is substituted with a halogen atom such as fluorine. The non-aqueous electrolyte is not limited to a liquid electrolyte, and may be a solid electrolyte. For example, a lithium salt such as $LiPF_6$ is used as the electrolyte salt.

The non-aqueous electrolyte secondary battery 10 comprises insulating plates 18 and 19 arranged above and below the electrode assembly 14, respectively. In the example shown in FIG. 1, a positive electrode lead 20 attached to the positive electrode 11 extends to the side of the sealing assembly 17 through the through hole of the insulating plate 18, and a negative electrode lead 21 attached to the negative electrode 12 extends to the bottom side of the exterior can 16 through the outside of the insulating plate 19. The positive electrode lead 20 is connected to the lower surface of a bottom plate 23 of the sealing assembly 17, by welding or the like, and a cap 27, which is a top plate of the sealing assembly 17 electrically connected to the bottom plate 23, serves as a positive electrode terminal. The negative electrode lead 21 is connected to the inner surface of bottom of the exterior can 16 by welding or the like, and the exterior can 16 serves as a negative electrode terminal.

The exterior can 16 is, for example, a metal container with a bottomed cylindrical shape. A gasket 28 is provided between the exterior can 16 and the sealing assembly 17 to ensure the sealability inside the battery. The exterior can 16 has, for example, a projecting portion 22 for supporting the sealing assembly 17, in which a part of the side surface of the exterior can 16 protrudes inward. The projecting portion 22 is preferably formed in an annular shape along the circumferential direction of the exterior can 16, and the sealing assembly 17 is supported on the upper surface thereof.

The sealing assembly 17 has a structure in which a bottom plate 23, a lower vent member 24, an insulating member 25, an upper vent member 26, and a cap 27 are laminated in this order from the electrode assembly 14 side. Each member constituting the sealing assembly 17 has a disk shape or ring shape, for example, and each member except the insulating member 25 is electrically connected each other. The lower vent member 24 and the upper vent member 26 are connected together at their respective central portions, and the insulating member 25 is interposed between the respective peripheral portions. When the internal pressure of the battery rises due to abnormal heat generation, the lower vent member 24 is deformed and broken so as to push the upper vent member 26 toward the cap 27 side, and the current path between the lower vent member 24 and the upper vent member 26 is blocked. When the internal pressure further rises, the upper vent member 26 is broken and gas is discharged from the opening of the cap 27.

Hereinafter, the positive electrode 11, the negative electrode 12, and the separator 13 constituting the electrode assembly 14, particularly a positive electrode active material included in the positive electrode 11 will be described in detail.

[Positive Electrode]

The positive electrode 11 comprises a positive electrode current collector and a positive electrode mixture layer formed on at least one surface of the current collector. A foil of a metal stable in the potential range of the positive electrode 11 such as aluminum or aluminum alloy, a film in which the metal is disposed on the surface, or the like can be used as the positive electrode current collector. Preferably, the positive electrode mixture layer includes a positive electrode active material, a conductive agent, and a binder, and is formed on both sides of the positive electrode current collector. The positive electrode 11 can be produced by applying onto the positive electrode current collector a positive electrode mixture slurry including a positive electrode active material, a conductive agent, and a binder, drying the coating film, and then compressing the coating film to form the positive electrode mixture layer on both sides of the positive electrode current collector.

Examples of the conductive agent included in the positive electrode mixture layer include carbon materials such as carbon black, acetylene black, ketjen black, and graphite. Examples of the binder included in the positive electrode mixture layer include: fluororesins such as polytetrafluoroethylene (PTFE) and polyvinylidene fluoride (PVdF); polyacrylonitrile (PAN); polyimide; acrylic resin; and polyolefins. These resins may be used in combination with a cellulose derivative such as carboxymethylcellulose (CMC) or a salt thereof, or polyethylene oxide (PEO).

The positive electrode active material includes a lithium transition metal composite oxide having a layered structure, containing 80 mol % or more of Ni with respect to the total number of moles of metal elements excluding Li, and containing at least one metal element selected from Co, Mn, Al, W, Mg, Mo, Nb, Ti, Si, and Zr. The positive electrode active material includes the composite oxide as a main component, and the content of the composite oxide in the positive electrode active material is preferably 90% by mass or more, and may be substantially 100% by mass. The positive electrode active material may include a lithium transition metal composite oxide other than the composite oxide, or other compounds as long as the object of the present disclosure is not impaired. Hereinafter, unless otherwise specified, the lithium transition metal composite oxide means the above composite oxide having 80 mol % or more of the content of Ni.

The lithium transition metal composite oxide constituting the positive electrode active material preferably contains at least one selected from Co, Mn, and Al. The content of at least one selected from Co, Mn, and Al is 20 mol % or less with respect to the total number of moles of metal elements excluding Li. Each of Co, Mn, and Al is preferably 10 mol % or less with respect to the total number of moles of metal elements excluding Li. Examples of preferable lithium transition metal composite oxides include composite oxides containing Ni, Co, and at least one of Mn and Al. Moreover, the lithium transition metal composite oxide may contain at least one of Mg and Zr.

The above lithium transition metal composite oxide may contain 85 mol % or more of Ni or may contain 90 mol % or more of Ni with respect to the total number of moles of metal elements excluding Li. The content of Ni is, for example, 80 to 95 mol %. An example of the preferable lithium transition metal composite oxide includes a composite oxide represented by the general formula: $Li_sNi_{(1-y-z)}Co_xM1_yO_2$ ($0 \leq x \leq 01$, $0 \leq y \leq 0.1$, $0.97 \leq z \leq 1.2$, where M1 is at least one metal element selected from Mn, Al, W, Mg, Mo, Nb, Ti, Si, and Zr). The above lithium transition metal composite oxide may contain elements other than Li, Ni, and the metal element Ml, such as Na, V, In, Ga, Y, Cr, and Zn, as long as the object of the present disclosure is not impaired.

The above lithium transition metal composite oxide is generally secondary particles formed by aggregating primary particles. The volume-based median diameter of the lithium transition metal composite oxide (secondary particles) is not particularly limited, but is preferably 2 μm to 20 μm, and more preferably 6 μm to 15 μm. The volume-based median diameter of the composite oxide is a particle size at which the volume integrated value is 50% in the particle size distribution measured by using the laser diffraction/scattering particle size distribution measuring apparatus, and is called 50 percent particle size (D50). The particle size of the primary particles constituting the secondary particles is, for example, 0.05 μm to 2 μm. The particle size of primary particles is measured as the circumscribed circle diameter in a particle image observed by a scanning electron microscope (SEM).

As for the positive electrode active material including the lithium transition metal composite oxide, when 250 mg of the positive electrode active material is added to 10 mL of a 17.5% by mass hydrochloric acid aqueous solution, heated and dissolved at 90° C. for 2 hours and then diluted to 50 mL, the amount of S dissolved in the diluted filtrate of the suspension is 0.002 mmol % or more as determined by inductively coupled plasma mass spectrometry (ICP-MS). When the amount of S dissolved unsatisfies this condition, good cycle characteristics cannot be obtained as shown in Examples described later. In the filtrate, sulfate ions ($SO_4^{2-}$) may be present and Li ions may not be present.

A specific method for quantifying the above component of the positive electrode active material dissolved is as follows.
(1) 250 mg of a positive electrode active material is added to 10 mL of a 17.5% by mass hydrochloric acid aqueous solution, heated and dissolved at 90° C. for 2 hours to prepare a suspension in which the active material is dispersed in the aqueous solution. The temperature during preparation of the suspension may be about 90° C., for example 90° C.±5° C.
(2) The suspension is filtered (solid-liquid separation) to provide a filtrate including components dissolved such as S. Then, dilution is performed to 50 mL with distilled water.
(3) The above components dissolved in the filtrate are quantified by using an ICP-MS apparatus.

S in the filtrate is a component dissolved derived from a compound containing $SO_4$ (hereinafter sometimes referred to as "$SO_4$ containing compound"), and the positive electrode active material is considered to include the $SO_4$ containing compound. The $SO_4$ containing compound is present, for example, on the surfaces of particles of the lithium transition metal composite oxide. The $SO_4$ containing compound may be present inside the secondary particles, that is, on the surfaces of the primary particles (interfaces between the primary particles) that do not appear on the surfaces of the secondary particles, but is preferably present on the surfaces of the secondary particles in a larger amount than inside the secondary particles.

Uniform presence of the $SO_4$ containing compound is preferable on the entire surfaces of the particles of the lithium transition metal composite oxide. It is assumed that the $SO_4$ containing compound present on the surfaces of the particles of the lithium transition metal composite oxide functions as a protective layer to suppress the decomposition reaction of the electrolytic solution on the surfaces of the particles. When S is included in the above filtrate at a concentration of 0.002 mmol or more, it is considered that the function as a protective layer by the $SO_4$ containing compound is sufficiently exhibited and the cycle characteristics of the battery are improved.

The amount of S dissolved included in the filtrate is preferably 0.003 mmol or more. The upper limit of the amount of S dissolved is not particularly limited from the viewpoint of cycle characteristics, but is preferably 0.24 mmol in consideration of, for example, battery capacity and output. The amount of S dissolved is, for example, 0.003 to 0.03 mmol.

The amount of the metal element M (metal element other than Ni, Co, Al, and Mn, and preferably at least one metal element selected from W, Mg, Mo, Nb, Ti, Si, and Zr) dissolved included in the above filtrate is preferably 0.0001 mmol or more. The upper limit of the amount of the metal element M dissolved is not particularly limited from the viewpoint of cycle characteristics, but is preferably 0.3 mmol in consideration of, for example, battery capacity and output.

It is assumed that the $SO_4$ containing compound present on the surfaces of the particles of the lithium transition metal composite oxide is at least one selected from lithium sulfate, zirconium sulfate, magnesium sulfate, and cobalt sulfate. For example, at least lithium sulfate is present on the surface of the particles of the lithium transition metal composite oxide. In addition, hydroxides or oxides of, for example, Zr, Mg, and Co may be present on the surface of the particles of the lithium transition metal composite oxide.

Li included in the positive electrode active material is preferably 7.4% by mass or less, more preferably 7.3% by mass or less, and particularly preferably 7.1% by mass or less. The amount of Li may be 7.0% by mass or less, but in this case, the charge capacity may decrease or the reaction resistance may increase. When the amount of Li is more than 7.4% by mass, the positive electrode mixture slurry used for forming the positive electrode mixture layer is gelled, and thus it becomes difficult to form a high-quality positive electrode mixture layer. The positive electrode active material is produced by adding a predetermined sulfuric acid compound to a lithium transition metal composite oxide that has been washed with water, and then heat-treating at a low temperature in a vacuum condition, thereby suppressing the occurrence of cation mixing and reducing the amount of Li dissolved.

In addition to the $SO_4$ containing compound, at least one of tungsten trioxide ($WO_3$) and lithium tungstate produced by reaction of excess Li and $WO_3$ of the lithium transition metal composite oxide may be fixed on the surfaces of the particles of the lithium transition metal composite oxide. As in the case of the $SO_4$ containing compound, uniform fixing of $WO_3$ and lithium tungstate is preferable on the entire surfaces of the particles of the lithium transition metal composite oxide. When $WO_3$ and lithium tungstate are present on the surfaces of the particles, the cycle characteristics of the buttery are further improved by the synergistic action with the $SO_4$ containing compound. The content of $WO_3$ and lithium tungstate is preferably 0.01 to 0.5 mol % in terms of W element with respect to the total number of moles of metal elements excluding Li of the lithium transition metal composite oxide.

The fixing of $WO_3$ and lithium tungstate on the surfaces of the particles of the lithium transition metal composite oxide and the content thereof can be observed and quantified by using SEM and an ICP emission spectrometer. $SO_4$ containing compounds, such as phosphorus compounds, boron compounds, and rare earth compounds, and inorganic particles other than $WO_3$ and lithium tungstate may be present on the surfaces of the particles of the lithium transition metal composite oxide.

The above positive electrode active material can be produced by a production method including the following steps:
(1) a step of oxidizing and roasting a hydroxide containing at least Ni obtained by a crystallization method to provide a composite oxide;
(2) a step of mixing the composite oxide with a lithium compound and firing the mixed particles to provide a lithium transition metal composite oxide; and
(3) a step of washing the lithium transition metal composite oxide with water, thereafter mixing the composite oxide with at least one selected from magnesium sulfate, zirconium sulfate, and cobalt sulfate, and heat-treating the mixture under a vacuum condition at a temperature of 150 to 280° C.

In the step (1), a hydroxide containing Ni, Co, and Al is obtained by a coprecipitation method using, for example, nickel sulfate, cobalt sulfate, and aluminum sulfate as raw materials. A composite oxide containing Ni, Co, and Al is obtained by firing (oxidation roasting) the hydroxide in air at 500 to 700° C. for 1 to 3 hours. The composite oxide obtained in the step (1) contains at least Ni, preferably further contains Co, and more preferably further contains at least one of Mn and Al.

In the step (2), the mixture of the composite oxide obtained in the step (1) and the lithium compound is fired at a temperature of more than 700° C. The preferable range of the firing temperature is 700 to 900° C. The firing is preferably performed in an oxygen stream. In the step (2), an excess lithium compound over the stoichiometric ratio of the desired product is generally used. Examples of the lithium compound include lithium carbonate, lithium hydroxide, lithium nitrate, and lithium sulfate. Of these, lithium carbonate and lithium hydroxide are preferable. In addition, before proceeding to the step (3), the lithium transition metal composite oxide is preferably crushed and classified to adjust D50 to a predetermined range.

In the step (3), the lithium transition metal composite oxide obtained in the step (2) is washed with water and subjected to solid-liquid separation to provide a powder of the composite oxide having a moisture content of, for example, 3 to 8% by mass. At least one selected from magnesium sulfate, zirconium sulfate, and cobalt sulfate is added to and mixed with the powder of the composite oxide. The amount of, for example, magnesium sulfate added is preferably 0.01 to 0.5 mol % in terms of metal elements of Mg, Zr, or Co with respect to the total number of moles of metal elements excluding Li of the lithium transition metal composite oxide. Tungsten oxide may be added together with, for example, magnesium sulfate.

The mixed powder of the lithium transition metal composite oxide and magnesium sulfate for example is heat-treated under a vacuum condition at a low temperature of 150 to 280° C. The heat treatment temperature is more preferably 150 to 210° C. Heat-treating the mixed powder at a low temperature in a vacuum condition provides the positive electrode active material in which occurrence of cation mixing is suppressed and a protective layer of a $SO_4$ containing compound is formed on the surfaces of the particles of lithium transition metal composite oxide. When the heat treatment in the step (3) is performed in an oxygen atmosphere (in the air), cation mixing occurs and the initial capacity decreases.

When nickel sulfate, cobalt sulfate, and aluminum sulfate are used as the raw material of the hydroxide in the step (1) and zirconium sulfate is added in the step (3), the metal element contained in the positive electrode active material is, for example, Li, Ni, Co, Al, or Zr. In this case, when 250 mg of the positive electrode active material is added to 10 mL of a 17.5% by mass hydrochloric acid aqueous solution, heated and dissolved at 90° C. for 2 hours and then diluted to 50 mL, the amount of S dissolved in the diluted filtrate of the suspension is 0.002 mmol or more as determined by ICP-MS. The non-aqueous electrolyte secondary battery using the positive electrode active material exhibits excellent cycle characteristics.

[Negative Electrode]

A negative electrode 12 comprises a negative electrode current collector and a negative electrode mixture layer formed on at least one surface of the current collector. A foil of a metal stable in the potential range of the negative electrode 12 such as copper or copper alloy, a film in which the metal is disposed on the surface, or the like can be used as the negative electrode current collector. Preferably, the negative electrode mixture layer includes a negative electrode active material and a binder, and is formed on both sides of the negative electrode current collector. The negative electrode 12 can be produced by applying onto the negative electrode current collector a negative electrode mixture slurry including, for example, a negative electrode active material and a binder, drying the coating film, and then compressing the coating film to form the negative electrode mixture layer on both sides of the current collector.

The negative electrode active material is not particularly limited as long as it can reversibly intercalate and deintercalate lithium ions, and a carbon material such as graphite is generally used. The graphite may be any of natural graphite such as flake graphite, lump graphite, and earth graphite and artificial graphite such as lump artificial graphite and graphitized mesophase carbon microbeads. In addition, metals such as Si and Sn that are alloyed with Li, metal compounds containing Si and Sn, and lithium titanium composite oxides may be used as the negative electrode active material. Examples of the Si containing compound include a Si containing compound represented by $SiO_x$ ($0.5 \leq x \leq 1.5$).

As a binder included in the negative electrode mixture layer, fluorine-containing resin such as PTFE and PVdF, PAN, polyimide, acrylic resin, and polyolefins may be used as in the case of the positive electrode 11, but styrene-butadiene rubber (SBR) is preferably used. In addition, the negative electrode mixture layer may include CMC or a salt thereof, polyacrylic acid (PAA) or a salt thereof, PVA, or the like. The negative electrode mixture layer includes, for example, SBR and CMC or a salt thereof.

[Separator]

As a separator 13, a porous sheet having ion permeability and insulating property is used. Specific examples of the porous sheet include a microporous thin film, a woven fabric, and a non-woven fabric. As the material of the separator 13, polyolefins such as polyethylene and polypropylene, cellulose, and the like are suitable. The separator 13 may have a single-layer structure or a laminated structure. In addition, on the surface of the separator 13, a resin layer having high heat resistance such as an aramid resin or a filler layer including a filler of an inorganic compound may be provided.

EXAMPLES

Hereinafter, the present disclosure will be further described with reference to examples, but the present disclosure is not limited to these examples.

Example 1

[Production of Positive Electrode Active Material]

A nickel cobalt aluminum composite hydroxide obtained by the coprecipitation method was oxidatively roasted to synthesize a composite oxide represented by $Ni_{0.91}Co_{0.045}Al_{0.045}O_2$. The composite oxide and lithium hydroxide were mixed so that the molar ratio between the metal elements in the composite oxide and Li in the lithium hydroxide was 1:1.02, the mixture was fired under oxygen flow at 745° C. for 6 hours, and then the fired product was crushed and classified to provide a lithium transition metal composite oxide having a D50 of 12 μm. The lithium transition metal composite oxide was secondary particles formed by aggregating primary particles.

1500 g of a lithium transition metal composite oxide was poured into 1 L of water, washed with water, and subjected to solid-liquid separation to provide powder of a composite oxide having a moisture content of 3 to 8% by mass. The powder of the composite oxide was mixed with zirconium sulfate, and the mixed powder was heat-treated under a vacuum condition at 180° C. for 3 hours to provide a positive electrode active material. Herein, the amount of zirconium sulfate added was 0.05 mol % in terms of Zr element with respect to the total number of moles of metal elements excluding Li of the lithium transition metal composite oxide.

The amounts of S and the metal element M (Zr) eluted from the positive electrode active material were quantified by the following procedure. The measurement results are shown in Table 1 (the same applies to the following Examples and Comparative Examples).

(1) 250 mg of a positive electrode active material is added to 10 mL of a 17.5% by mass hydrochloric acid aqueous solution, heated and dissolved at 90° C. for 2 hours to prepare a suspension in which the active material is dispersed in the aqueous solution.

(2) The suspension is filtered and diluted to 50 mL with distilled water to provide a filtrate including S and M.

(3) S and M in the filtrate are quantified by using ICP-MS apparatus (SPS3100, manufactured by Hitachi High-Tech Science Corporation).

[Production of Positive Electrode]

The above positive electrode active material, acetylene black, and polyvinylidene fluoride (PVdF) were mixed in a solid content mass ratio of 100:0.75:0.6 to prepare a positive electrode mixture slurry with N-methyl-2-pyrrolidone (NMP) as a dispersion medium. Subsequently, the positive electrode mixture slurry was applied onto both sides of a positive electrode current collector formed of aluminum foil, the coating film was dried and compressed, and then this was cut into a predetermined electrode size to produce a positive electrode in which positive electrode mixture layers were formed on both sides of the positive electrode current collector.

[Production of Negative Electrode]

Graphite and a Si containing compound represented as $SiO_x$ (x=1.0) were mixed at a mass ratio of 94:6 and this was used as a negative electrode active material. The negative electrode active material, a dispersion of styrene butadiene rubber (SBR), and sodium carboxylmethylcellulose (CMC-Na) were mixed in a solid content mass ratio of 98:1:1 to prepare a negative electrode mixture slurry with water as a dispersion medium. Subsequently, the negative electrode mixture slurry was applied onto both sides of the negative electrode current collector formed of copper foil, the coating film was dried and compressed, and then this was cut into a predetermined electrode size to produce a negative electrode in which negative electrode mixture layers were formed on both sides of the negative electrode current collector.

[Preparation of Non-Aqueous Electrolyte]

Ethylene carbonate (EC), methyl ethyl carbonate (EMC), and dimethyl carbonate (DMC) were mixed in a volume ratio of 20:5:75. $LiPF_6$ was dissolved in the mixed solvent so as to obtain a concentration of 1.2 mol/L to prepare a non-aqueous electrolyte.

[Production of Battery]

An aluminum lead was attached to the above positive electrode, a nickel lead was attached to the above negative electrode, and the positive electrode and the negative electrode were spirally wound via a polyethylene separator to produce a wound electrode assembly. The electrode assembly was accommodated in a bottomed cylindrical battery case body having an outer diameter of 18.2 mm and a height of 65 mm, the above non-aqueous electrolyte solution was injected therein, and the opening of the battery case body was sealed with a gasket and a sealing assembly to produce a cylindrical non-aqueous electrolyte secondary battery.

Example 2

A positive electrode active material and a battery were obtained in the same manner as in Example 1, except that magnesium sulfate (0.10 mol % in terms of Mg element) was used instead of zirconium sulfate in the production of the positive electrode active material.

Example 3

A positive electrode active material and a battery were obtained in the same manner as in Example 1, except that tungsten trioxide (0.05 mol % in terms of W element) was used together with zirconium sulfate in the production of the positive electrode active material.

Supplement of (1): a positive electrode active material and a battery were obtained in the same manner as in Example 1, except that the amount of zirconium sulfate added was 0.10 mol % in terms of Zr element with respect to the total number of moles of metal elements excluding Li of the lithium transition metal composite oxide in the preparation of the positive electrode active material.
Supplement of (2): a positive electrode active material and a battery were obtained in the same manner as in Comparative Example 2, except that lithium sulphate (0.10 mol %) was used together with zirconium oxide (0.10 mol %) in the production of the positive electrode active material.

Comparative Example 1

A positive electrode active material and a battery were obtained in the same manner as in Example 1, except that zirconium sulfate was not added in the production of the positive electrode active material.

Comparative Example 2

A positive electrode active material and a battery were obtained in the same manner as in Example 1, except that zirconium oxide was used instead of zirconium sulfate in the production of the positive electrode active material.

Comparative Example 3

A positive electrode active material was obtained in the same manner as in Comparative Example 1, except that a fired product was not washed with water in the production of the positive electrode active material. In this case, the positive electrode mixture slurry was gelled, thus failing to form the positive electrode mixture layer capable of being subjected to the cycle test.

Comparative Example 4

A positive electrode active material was obtained in the same manner as in Example 1, except that a fired product was not washed with water in the production of the positive electrode active material. In this case, the positive electrode mixture slurry was gelled, thus failing to form the positive electrode mixture layer capable of being subjected to the cycle test.

Comparative Example 5

A positive electrode active material and a battery were obtained in the same manner as in Example 2, except that tungsten trioxide was used instead of magnesium sulfate in the production of the positive electrode active material.

Comparative Example 6

A positive electrode active material and a battery were obtained in the same manner as in Comparative Example 5, except that zirconium oxide (0.05 mol %) was used together with tungsten trioxide (0.05 mol %) in the production of the positive electrode active material.

Referential Example 1

A positive electrode active material and a battery were obtained in the same manner as in Comparative Example 2, except that zirconium oxide was added during firing in the production of the positive electrode active material.

Referential Example 2

A positive electrode active material and a battery were obtained in the same manner as in Referential Example 1, except that zirconium sulfate was used instead of zirconium oxide in the production of the positive electrode active material.

Referential Example 3

A positive electrode active material and a battery were obtained in the same manner as in Referential Example 1, except that magnesium oxide was used instead of zirconium oxide in the production of the positive electrode active material.

Referential Example 4

A positive electrode active material and a battery were obtained in the same manner as in Referential Example 1, except that magnesium sulfate was used instead of zirconium oxide in the production of the positive electrode active material.

Referential Example 5

A positive electrode active material and a battery were obtained in the same manner as in Referential Example 4, except that the amount of magnesium sulfate added was changed to 0.10 mol % in the production of the positive electrode active material.

[Evaluation of Cyclic Characteristics (Capacity Retention Rate)]

Each of batteries of Examples and Comparative Examples (except for Comparative Examples 3 and 4) were charged to a battery voltage of 4.2 V at a constant current of 0.3 It at 45° C., and then charged to a final current of 70 mA at a constant voltage of 4.2 V. Thereafter, discharge was performed to a battery voltage of 2.5 V at a constant current of 0.5 It. This charge-and-discharge cycle was repeated for 300 cycles, and the ratio of the discharge capacity in 300 cycles to the discharge capacity in the first cycle (capacity retention rate) was determined. Table 1 shows the capacity retention rate of each battery with respect to a relative value when the capacity retention rate of the battery in Comparison Example 1 was 100.

TABLE 1

|  | Additives | Amount Added (mol%) | Addition method | Amount of S dissolved (mmol) | Amount of M dissolved (mmol) | Capacity retention rate (—) |
|---|---|---|---|---|---|---|
| Example 1 | $Zr(SO_4)_2$ | 0.05 | After washing with water | 0.0040 | 0.00134 | 108 |
| Supplement of (1) | $Zr(SO_4)_2$ | 0.10 | After washing with water | 0.0078 | 0.00265 | 107 |
| Example 2 | $MgSO_4$ | 0.10 | After washing with water | 0.0042 | 0.00270 | 107 |
| Example 3 | $Zr(SO_4)_2 + WO_3$ | 0.05 + 0.05 | After washing with water | 0.0038 | 0.00137 | 110 |
| Comparative Example 1 | — | — | — | 0.0011 | — | 100 |
| Comparative Example 2 | $Zr(SO_4)_2$ | 0.05 | After washing with water | 0.0014 | 0 | 100 |
| Comparative Example 3 | — | — | — | 0.0019 | — | Unmeasurable |

TABLE 1-continued

|  | Additives | Amount Added (mol%) | Addition method | Amount of S dissolved (mmol) | Amount of M dissolved (mmol) | Capacity retention rate (—) |
|---|---|---|---|---|---|---|
| Comparative Example 4 | $Zr(SO_4)_2$ | 0.05 | After firing (without washing with water) | 0.0018 | 0.00135 | Unmeasurable |
| Comparative Example 5 | $WO_3$ | 0.10 | After washing with water | 0.0012 | 0.0010 | 100 |
| Comparative Example 6 | $ZrO_2 + WO_3$ | 0.05 + 0.05 | After washing with water | 0.0014 | 0.0005 | 100 |
| Supplement of (2) | $ZrO_2 + Li_2SO_4$ | 0.10 + 0.10 | After washing with water | 0.0019 | 0 | 95 |
| Referential Example 1 | $ZrO_2$ | 0.05 | During firing | 0.0012 | 0 | — |
| Referential Example 2 | $Zr(SO_4)_2$ | 0.05 | During firing | 0.0011 | 0.00128 | — |
| Referential Example 3 | $MgO$ | 0.05 | During firing | 0.0010 | 0.0013 | — |
| Referential Example 4 | $MgSO_4$ | 0.05 | During firing | 0.0013 | 0.0015 | — |
| Referential Example 5 | $MgSO_4$ | 0.10 | During firing | 0.0012 | 0.0025 | — |

As can be seen from the results shown in Table 1, all of the batteries in Examples have higher capacity retention rate after the cycle test than the batteries in Comparative Examples, and thus have excellent cycle characteristics. In the batteries in Comparative Examples and Referential Examples, S included in the above filtrate was less than 0.002 mmol, and particularly, the battery in Referential example, to which zirconium sulfate was added during firing of the composite oxide, had a small amount of S dissolved. When S included in the above filtrate has 0.002 mmol or more, a high-quality positive electrode mixture layer can be formed, and the cycle characteristics of the battery are specifically improved.

Comparative Example 7

A positive electrode active material and a battery were obtained in the same manner as in Example 1, except that a positive electrode active material was produced by the following method.

[Production of Positive Electrode Active Material]

A nickel cobalt aluminum manganese composite hydroxide obtained by the coprecipitation method was oxidatively roasted to synthesize a composite oxide represented by $Ni_{0.92}Co_{0.02}Al_{0.01}Mn_{0.05}O_2$. The composite oxide and lithium hydroxide were mixed so that the molar ratio between the metal elements in the composite oxide and Li in the lithium hydroxide was 1:1.02, the mixture was fired under oxygen flow at 745° C. for 6 hours, and then the fired product was crushed and classified to provide a lithium transition metal composite oxide having a D50 of 12 μm. The lithium transition metal composite oxide was secondary particles formed by aggregating primary particles. 1250 g of a lithium transition metal composite oxide was poured into 1 L of water, washed with water, and subjected to solid-liquid separation to provide powder of a composite oxide having a moisture content of 3 to 8% by mass. The powder of the composite oxide was heat-treated under a vacuum condition at 180° C. for 3 hours to provide a positive electrode active material.

Comparison Example 8

A positive electrode active material and a battery were obtained in the same manner as in Comparative Example 7, except that the lithium transition metal composite oxide washed with water was heat-treated in the atmosphere for 30 minutes at 150° C., and then heat-treated under a vacuum condition for 3 hours at 180° C. in the production of the positive electrode active material.

Comparison Example 9

A positive electrode active material and a battery were obtained in the same manner as in Comparative Example 7, except that the lithium transition metal composite oxide washed with water was heat-treated in the atmosphere for 30 minutes at 250° C., and then heat-treated under a vacuum condition for 3 hours at 180° C. in the production of the positive electrode active material.

[Production of Test Battery]

The above positive electrode and the negative electrode consisting of lithium metal foil were laminated in such a way that they were opposing each other via a separator, and this was wound to produce an electrode assembly. Subsequently, the electrode assembly and the above non-aqueous electrolyte were inserted into an aluminum coin-shaped exterior body to provide a test battery.

The charge capacity and reaction resistance were measured in the above test battery for each battery in Comparative Examples 7 to 9. The measurement results are shown in Table 2.

[Measurement of Initial Discharge Capacity]

For the above test battery, the constant current charging was performed to a battery voltage of 4.3 V at 0.7 mA and a temperature of 25° C., the constant voltage charging was then performed to a current value of 0.07 mA at 4.3 V, and the initial charge capacity was determined.

[Measurement of Reaction Resistance]

The AC impedance from 20 kHz to 0.01 Hz was measured by using an AC impedance measuring instrument, a call call plot was drawn from the measured data, and the reaction resistance was determined from the size of the arc between 10 Hz and 0.1 Hz.

TABLE 2

|  | Heat-treatment condition | Amount of S dissolved | Amount of M dissolved | Initial charge Capacity (mAh/g) | Reaction resistance (Ω) |
|---|---|---|---|---|---|
| Comparative Example 7 | 180° C. for 3 hours (vacuum) | 0.0011 | — | 239.4 | 60.6 |
| Comparative Example 8 | 150° C. for 30 minutes (atmosphere) and 180° C. for 3 hours (vacuum) | 0.0011 | — | 238.3 | 74.5 |
| Comparative Example 9 | 250° C. for 30 minutes (atmosphere) and 180° C. for 3 hours (vacuum) | 0.0014 | — | 238.2 | 132.9 |

As shown in Table 2, heat-treating (drying) the positive electrode active material washed with water in the atmosphere (Comparative Examples 8 and 9) results in lower initial capacity and higher reaction resistance, as compared with heat-treating in vacuum (Comparative Example 7). When the heat treatment is performed in an oxygen atmosphere, it is considered that cation mixing occurs and the initial capacity decreases.

REFERENCE SIGNS LIST 10 non-aqueous electrolyte secondary battery
11 positive electrode
12 negative electrode
13 separator
14 electrode assembly
15 battery case
16 exterior can
17 sealing assembly
18, 19 insulating plate
20 positive electrode lead
21 negative electrode lead
22 projecting portion
23 bottom plate
24 lower vent member
25 insulating member
26 upper vent member
27 cap
28 gasket

The invention claimed is:

1. A method for producing a positive electrode active material for a non-aqueous electrolyte secondary battery, the method including:
a step of oxidizing and roasting a hydroxide containing at least Ni obtained by a crystallization method to provide a composite oxide;
a step of mixing the composite oxide with a lithium compound and firing the mixed particles to provide a lithium transition metal composite oxide; and
a step of washing the lithium transition metal composite oxide with water, thereafter mixing the composite oxide with at least one selected from magnesium sulfate, zirconium sulfate, and cobalt sulfate, and heat-treating the mixture at a temperature of 150 to 280° C.
the lithium transition metal composite oxide containing 80 mol % or more of Ni with respect to the total number of moles of metal elements excluding Li and containing at least one metal element selected from Co, Mn, Al, W, Mg, Mo, Nb, Ti, Si, and Zr,
wherein when 250 mg of the positive electrode active material is added to 10 mL of a 17.5% by mass hydrochloric acid aqueous solution, heated and dissolved at 90° C. for 2 hours and then diluted to 50 mL, an amount of S dissolved in the diluted filtrate of the suspension is 0.002 mmol or more as determined by inductively coupled plasma mass spectrometry.

2. The method for producing a positive electrode active material for a non-aqueous electrolyte secondary battery according to claim 1, wherein the lithium transition metal composite oxide contains at least one selected from Co, Al, and Mn, and an amount of a metal element M (at least one metal element selected from W, Mg, Mo, Nb, Ti, Si, and Zr) dissolved in the filtrate is 0.0001 mmol or more.

3. The method for producing a positive electrode active material for a non-aqueous electrolyte secondary battery according to claim 1, wherein at least one of tungsten trioxide and lithium tungstate is fixed on a surface of particles of the lithium transition metal composite oxide.

4. A non-aqueous electrolyte secondary battery, comprising:
a positive electrode including the positive electrode active material produced by the method according to claim 1;
a negative electrode; and
a non-aqueous electrolyte.

5. A method for producing the positive electrode active material for a non-aqueous electrolyte secondary battery, the method including:
a step of oxidizing and roasting a hydroxide containing at least Ni obtained by a crystallization method to provide a composite oxide;
a step of mixing the composite oxide with a lithium compound and firing the mixed particles to provide a lithium transition metal composite oxide; and
a step of washing the lithium transition metal composite oxide with water, thereafter mixing the composite oxide with at least one selected from magnesium sulfate, zirconium sulfate, and cobalt sulfate, and heat-treating the mixture under a vacuum condition at a temperature of 150 to 280° C.,
the lithium transition metal composite oxide containing 80 mol % or more of Ni with respect to the total number of moles of metal elements excluding Li and containing at least one metal element selected from Co, Mn, Al, W, Mg, Mo, Nb, Ti, Si, and Zr,
wherein when 250 mg of the positive electrode active material is added to 10 mL of a 17.5% by mass hydrochloric acid aqueous solution, heated and dissolved at 90° C. for 2 hours and then diluted to 50 mL, an amount of S dissolved in the diluted filtrate of the suspension is 0.002 mmol or more as determined by inductively coupled plasma mass spectrometry.

6. The method for producing a positive electrode active material for a non-aqueous electrolyte secondary battery according to claim 5, wherein the lithium transition metal composite oxide contains at least one selected from Co, Al, and Mn, and an amount of a metal element M (at least one metal element selected from W, Mg, Mo, Nb, Ti, Si, and Zr) dissolved in the filtrate is 0.0001 mmol or more.

7. The method for producing a positive electrode active material for a non-aqueous electrolyte secondary battery according to claim 5, wherein at least one of tungsten trioxide and lithium tungstate is fixed on a surface of particles of the lithium transition metal composite oxide.

8. A non-aqueous electrolyte secondary battery, comprising:
a positive electrode including the positive electrode active material produced by the method according to claim 5;
a negative electrode; and
a non-aqueous electrolyte.

* * * * *